(12) United States Patent
Dawidowski et al.

(10) Patent No.: US 12,572,140 B2
(45) Date of Patent: Mar. 10, 2026

(54) ASSET PROTECTION, MONITORING, OR CONTROL DEVICE AND METHOD, AND ELECTRIC POWER SYSTEM

(71) Applicant: Hitachi Energy Ltd, Zürich (CH)

(72) Inventors: Pawel Dawidowski, Malopolskie (PL); Jan Poland, Nussabaumen (CH); James Ottewill, Cracow (PL)

(73) Assignee: Hitachi Energy Ltd, Zurich (CH)

( * ) Notice: Subject to any disclaimer, the term of this patent is extended or adjusted under 35 U.S.C. 154(b) by 791 days.

(21) Appl. No.: 17/716,575

(22) Filed: Apr. 8, 2022

(65) Prior Publication Data

US 2022/0326700 A1 Oct. 13, 2022

(30) Foreign Application Priority Data

Apr. 9, 2021 (EP) .................................... 21167716

(51) Int. Cl.
G05B 23/02 (2006.01)
G06N 3/0442 (2023.01)

(52) U.S. Cl.
CPC ....... G05B 23/0259 (2013.01); G06N 3/0442 (2023.01)

(58) Field of Classification Search
CPC . G05B 23/0259; G05B 23/024; G06N 3/0442
See application file for complete search history.

(56) References Cited

U.S. PATENT DOCUMENTS

| | | | |
|---|---|---|---|
| 5,805,400 | A | 9/1998 | Kim |
| 2004/0199362 | A1 | 10/2004 | Cao et al. |
| 2022/0373612 | A1* | 11/2022 | Tharmakulasingam ..................... |
| | | | G06N 3/045 |

FOREIGN PATENT DOCUMENTS

| | | |
|---|---|---|
| CN | 110346717 A | 10/2019 |
| CN | 110912126 A | 3/2020 |
| CN | 111709447 A | 9/2020 |
| CN | 111950526 A | 11/2020 |
| CN | 112200032 A | 1/2021 |
| EP | 0369577 A2 | 5/1990 |
| JP | 2001-186651 A | 7/2001 |

OTHER PUBLICATIONS

Barati, Masoud. "Faster than real-time prediction of disruptions in power grids using PMU: Gated recurrent unit approach." In 2019 IEEE power & energy society innovative smart grid technologies conference (ISGT), pp. 1-5. IEEE, 2019. (Year: 2019).*
Yoshimura et al., A Construction Method of a Filter with Complicated Characteristics by Use of Recurrent Neural Network∂, Reports of the Faculty of Engineering, Tottori University, pp. 47-53, 1997, Japan.

(Continued)

*Primary Examiner* — Howard Cortes
(74) *Attorney, Agent, or Firm* — PROCOPIO, CORY, HARGREAVES & SAVITCH LLP

(57) ABSTRACT

An asset protection, monitoring, or control device is operative to execute a decision-making logic to process inputs and generate a decision-making logic output that comprises one or more time series, process the decision-making logic output using a machine learning model, and cause an action to be performed responsive to a machine learning model output.

20 Claims, 9 Drawing Sheets

(56) References Cited

OTHER PUBLICATIONS

Dai et al., "Power Consumption-based Anomaly Detection for Relay Protection", 2020 IEEE 4th Information Technology, Networking, Electronic and Automation Control Conference (ITNEC 2020), 978-1-7281-4390-3/20, p. 1139 to 1143, 5 pages, date unknown, 2020.

Strachan et al., "Providing Decision Support for the Condition-Based Maintenance of Circuit Breakers Through Data Mining of Trip Coil Current Signatures", IEEE Transactions on Power Delivery, vol. 22, No. 1, Jan. 2007, 0885-8977, p. 178 to 186, 9 pages.

IEC (International Electrotechnical Commission), IEC 61850-7-1, International Standard, Edition 2.1, Aug. 2020, "Communication networks and systems for power utility automation—Part 7-1: Basic communication structure—Principles and models", ISBN 978-2-8322-8823-8, Geneva, Switzerland, 200 pages.

IEC (International Electrotechnical Commission), IEC 61850-8-1, International Standard, Edition 2.0, Jun. 2011, ""Communication networks and systems for power utility automation—Part 8-1: Specific communication service mapping (SCSM)—Mappings to MMS (ISO 9506-1 and ISO 9506-2) and to ISO/IEC 8802-3, ISBN 978-2-88912-478-7, Geneva, Switzerland, 390 pages.

* cited by examiner

40

50

1

ASSET PROTECTION, MONITORING, OR CONTROL DEVICE AND METHOD, AND ELECTRIC POWER SYSTEM

CROSS-REFERENCE TO RELATED APPLICATIONS

The present application claims priority to European Patent Application No. 21167716.6, filed on Apr. 9, 2021, which is hereby incorporated herein by reference as if set forth in full.

FIELD OF THE INVENTION

The present disclosure relates to devices, systems, and methods for asset protection, monitoring or control. The present disclosure relates in particular to devices, systems, and methods in which a fault is detected and an action is taken in response to fault detection.

BACKGROUND OF THE INVENTION

There are a number of applications where it is necessary to include protection, monitoring, and/or control systems in order to prevent major failures. Examples of such applications include, amongst others, power system protection, where protection devices are used to disconnect faulted parts of an electrical network, or process monitoring systems used for identifying anomalous behaviors in an industrial plant which might be indicative of a developing failure. These protection, monitoring, and/or control systems may include high levels of automation due to the fact that decisions might need to be made more quickly than is possible by a human operator, and/or that there are often too many devices (and signals recorded by devices) that must be monitored at any given time.

The automation may include a decision-making logic which is used to determine whether or not a mitigation action (e.g. tripping a circuit breaker, or signaling an alarm to an operator) is employed. It is imperative that the correct decision be made as quickly as possible. Specifically it is important that a decision taken by a device of a protection, monitoring, and/or control system is:

Fast: The shorter the time required for a protection systems to identify a fault, the greater is the likelihood that the resulting mitigation actions will be able to prevent the fault from initiating a major failure.

Reliable:

Missed alarms (where a fault exists but the decision-making logic fails to react) must be minimal. The consequence of a missed alarm can be that a fault can escalate into a major failure, with associated financial and safety implications.

False alarms (where no fault exists but the decision-making logic erroneously initiates mitigation actions) can have safety and operational implications, for example if part of an electrical network is disconnected, or if an industrial plant is shut down.

Additionally, both false and missed alarms have the impact of reducing confidence in the protection system.

There is often a trade-off between reliable operation and fast operation of a protection, monitoring, and/or control system. Protection, monitoring, and/or control systems which are tuned to react more quickly are often more prone to false alarms as the sensitivity of the algorithm is increased to ensure quick reaction, meaning that the system is more susceptible to noise or transients. Conversely, protection, monitoring, and/or control systems which are tuned too conservatively might result in no false alarms, as sensitivity is reduced, but at the same time might lead to slow reaction speeds and potential missed alarms.

A decision-making logic can be based on a comparison between an indicator value, which is deemed to be representative of the extent to which the system might be considered faulty, and a threshold value, which indicates the level of the indicator when the fault is present in the system. The threshold comparison address a tradeoff between sensitivity and dependability.

EP 0 369 577 A2 discloses a protective relay which detects faults in electric power distribution systems which includes a comparator.

When a decision-making logic can indicate a false alarm for a typical event such as a switching operation, or a fault in the next protected zone. In order to overcome this, many protection systems employ an additional counter. This counter may count a number of consecutive samples during which the indicator level has exceeded its threshold. A fault is indicated and a mitigation action is instigated only if the number of samples exceeding the threshold reaches a predefined number.

This approach balances speed against security. The indicator values will continue to exceed the threshold indefinitely if a fault is truly present. If the indicator value intermittently exceeds the threshold due to noise and/or transients, then the indicator will typically again drop below the threshold, resetting the counter. Hence, the likelihood of a correct protection decision is increased at the expense of slower reaction times.

FIG. 12 is a schematic block diagram 120 of a technique which uses a counter to count a number of consecutive samples during which the indicator level has exceeded its threshold. Input signals are provided to a protection algorithm 121. The output of the protection algorithm 121 is an indicator value representative of whether the system is considered faulty by the protection algorithm. A threshold comparison is performed at 122 to compare an output of the protection algorithm 121 to a threshold. If the output is equal to or exceeds the threshold, a counter 123 is incremented. If the output is less than the threshold, the counter 123 is reset. An action is triggered when the counter 123 reaches a further threshold.

It is a considerable challenge to set the parameters of a logic as shown in FIG. 12. For illustration, it is a considerable challenge to set the threshold and predetermined value that the counter 123 must reach to perform an action. The difficulties are exacerbated when not only one, but several protection algorithms operate in parallel and provide outputs that need to be evaluated (using, e.g., threshold comparisons and counters as illustrated in FIG. 12, with the counters being combined by a Boolean logic) to identify a fault.

SUMMARY

There is a need to provide improved techniques for asset protection, monitoring or control. There is in particular a need for devices, systems, and methods that mitigate or eliminate the difficulties of setting the parameters used to process an indicator value provided by a decision-making logic to balance speed and dependability. There is also a need for devices, systems, and methods that balance speed and dependability while only moderately adding to storage or memory space requirements. It would also be desirable to provide devices, systems, and methods that afford interpretability of the manner in which an indicator value provided by a decision-making logic is processed to determine whether a corrective or other action is to be taken.

According to embodiments, a machine learning (ML) model is used to process the output of the decision-making logic. The ML model may be trained to provide nonlinear low-pass filter characteristics.

The ML model may have one or several artificial neural network (ANN) layer(s).

The ML model may have one or several recurrent neural network (RNN) layer(s). This facilitates the processing of a time-sequence of decision-making logic outputs.

The ML model may have a long short-term memory (LSTM) cell or a gated recurrent unit (GRU) cell or another recurrent architecture comprising different gates. The LTSM cell or GRU cell have gates that facilitate training the ML model to act as a nonlinear low-pass filter for the output of the decision-making logic, balancing speed and dependability of the device in which the ML model is used.

The parameters of the trained ANN or RNN (e.g., the parameters of a LSTM cell or GRU cell) lend themselves to interpretation by a human operator.

The decision-making logic may be implemented by a first ML model, and a second ML model may be used to process the output of the first ML model. The first and second ML models may be trained concurrently, improving overall performance. The first and second ML models may also be trained separately.

An asset monitoring, protection, or control device according to an embodiment comprises an interface to receive inputs related to the asset, and at least one integrated circuit (IC). The at least one IC is operative to execute a decision-making logic to process the inputs and generate a decision-making logic output, process the decision-making logic output using a ML model, and cause an action to be performed responsive to a ML model output.

The decision-making logic output (which is fed to the ML model as ML model input) may include one or several time series.

The ML model may be trained using ML.

The ML model may have one or several ANN layers.

The ML model may have a RNN layer.

The ML model may have several RNN layers.

The ML model may be operative to receive the decision-making logic output as a ML model input and output the ML model output that may indicate whether the action is to be taken.

The device may be an asset protection device, the action may be a protective action, and the asset protection device may further comprise an output interface to output a control signal to effect the protective action.

The ML model may be operative to process at least one additional decision-making logic output provided by at least one additional decision-making logic.

The at least one additional decision-making logic output may include one or several additional time series.

One of the decision logic and the at least one additional decision-making logic may be a time domain protection function.

Another one of the decision logic and the at least one additional decision-making logic may be a distance protection function.

The one or several time series fed by a decision-making logic to the ML model and/or, if present, the one or several additional time series fed by at least one additional decision-making logic to the ML model may include indicators indicating whether the decision-making logic considers a fault to be present or absent.

The one or several time series fed by a decision-making logic to the ML model and/or, if present, the one or several additional time series fed by at least one additional decision-making logic to the ML model may include indicators indicating which type of fault the decision-making logic considers to be present.

The one or several time series fed by a decision-making logic to the ML model and/or, if present, the one or several additional time series fed by at least one additional decision-making logic to the ML model may be binary (i.e., toggling between two distinct discrete values). One of the binary values may indicate the presence of a fault, and the other of the binary values may indicate the absence of the fault.

The one or several time series fed by a decision-making logic to the ML model and/or, if present, the one or several additional time series fed by at least one additional decision-making logic to the ML model may toggle between three or more than three discrete values. One of the discrete values may indicate the absence of a fault, and the other discrete values may indicate which one of several possible faults is deemed to be present by the decision-making logic.

The one or several time series may toggle between two, three, or more distinct discrete values.

The one or several time series fed by a decision-making logic to the ML model and/or, if present, the one or several additional time series fed by at least one additional decision-making logic to the ML model may be real-valued or complex-valued scalars.

The scalars may be included in a numerical range. Different sub-ranges of the numerical range may be associated with the presence and/or absence of a fault, and/or with different types of faults.

The one or several time series fed by a decision-making logic to the ML model and/or, if present, the one or several additional time series fed by at least one additional decision-making logic to the ML model may be vectors.

The ML model may have an output dense layer.

The decision-making logic output may be a time series.

The time series may toggle between a first value and a second value.

The time series may have only values that are either the first value or the second value.

The first and second values may be fixed.

The first value may be a first indicator value indicating that the decision-making logic considers a fault to be present and the second value may be a second indicator value indicating that the decision-making logic considers the fault to be absent.

The ML model may have a cell having a forget gate and/or an input gate.

The ML model may comprise a LSTM cell or a GRU cell or another recurrent architecture comprising different gates.

Biases of an ANN layer or RNN layer or the LSTM cell or the GRU cell may be zero.

The GRU cell may be a fully gated GRU cell.

The ML model may be operative to perform non-linear low-pass filtering of the decision-making logic output.

The decision-making logic may be a further ML model.

The decision-making logic and the ML model processing the decision-making logic output may be trained jointly or separately.

The inputs to the decision-making logic may comprise voltage and/or current measurements.

The inputs to the decision-making logic may include measurements received from a current transformer in a power transmission line.

The inputs to the decision-making logic may include bus bar voltage measurements.

The inputs to the decision-making logic may be included in messages of an industrial automation control system (IACS).

The inputs to the decision-making logic may be included in messages in accordance with IEC 61850 (e.g., in accordance with or compatible with 61850-7-1:2011 or IEC 61850-8-1:2011).

The inputs to the decision-making logic may comprise voltage and current measurements at an end of a transmission line of a power transmission system or of a distribution line of a power distribution system.

The action may comprise or may be selected from a corrective action, a protective action, causing information to be output via a human machine interface (HMI).

The action may be a circuit breaker (CB) trip.

The device may be a power system asset.

The device may be a protection relay.

The device may be a distance protection relay.

A protection system for an electric power system comprises one or several devices according to embodiments.

The protection system may comprise at least two devices according to embodiments that are functionally associated with opposite ends of a power transmission line.

An electric power system comprises an asset and the device according to an embodiment.

The electric power system may be a power generation, transmission or distribution system.

The asset may be a power transmission line or distribution line.

The device may be a protection relay operative to cause a CB trip responsive to the ML model output.

The electric power system may comprise at least one additional distance protection relay that is a device according to an embodiment and that is provided for distance protection of the line. I.e., devices according to embodiments may be deployed at various locations in an electric power system, e.g., on opposite ends of a transmission line and/or for providing protection for different zones.

A method of monitoring, protecting, or controlling an asset according to an embodiment comprises receiving inputs related to the asset, executing a decision-making logic to process the inputs and generate a decision-making logic output, processing the decision-making logic output using a ML model, and causing an action to be performed responsive to a ML model output.

The decision-making logic output (which is fed to the ML input) may include one or several time series.

The ML model may be trained using ML.

The method may further comprise training the ML model prior to deployment to a protection, monitoring, or control device.

The method may further comprise re-training or otherwise updating the ML model subsequent to deployment to a protection, monitoring, or control device for field use.

The method may be performed by at least one IC of a protection, monitoring, or control device.

The method may be performed automatically by a device according to an embodiment.

The ML model may have one or several ANN layers.

The ML model may have a RNN layer.

The ML model may have several RNN layers.

The ML model may be operative to receive the decision-making logic output as a ML model input and output the ML model output that may indicate whether the action is to be taken.

The method may be a method of protecting an asset, the action may be a protective action, and the method may further comprise outputting, via an output interface of an asset protection device, a control signal to effect the protective action.

The ML model may be operative to process at least one additional decision-making logic output provided by at least one additional decision-making logic.

The at least one additional decision-making logic output may include one or several additional time series.

One of the decision logic and the at least one additional decision-making logic may be a time domain protection function.

Another one of the decision logic and the at least one additional decision-making logic may be a distance protection function.

The one or several time series fed by a decision-making logic to the ML model and/or, if present, the one or several additional time series fed by at least one additional decision-making logic to the ML model may include indicators indicating whether the decision-making logic considers a fault to be present or absent.

The one or several time series fed by a decision-making logic to the ML model and/or, if present, the one or several additional time series fed by at least one additional decision-making logic to the ML model may include indicators indicating which type of fault the decision-making logic considers to be present.

The one or several time series fed by a decision-making logic to the ML model and/or, if present, the one or several additional time series fed by at least one additional decision-making logic to the ML model may be binary (i.e., toggling between two distinct discrete values). One of the binary values may indicate the presence of a fault, and the other of the binary values may indicate the absence of the fault.

The one or several time series fed by a decision-making logic to the ML model and/or, if present, the one or several additional time series fed by at least one additional decision-making logic to the ML model may toggle between three or more than three discrete values. One of the discrete values may indicate the absence of a fault, and the other discrete values may indicate which one of several possible faults is deemed to be present by the decision-making logic.

The one or several time series may toggle between two, three, or more distinct discrete values.

The one or several time series fed by a decision-making logic to the ML model and/or, if present, the one or several additional time series fed by at least one additional decision-making logic to the ML model may be real-valued or complex-valued scalars.

The scalars may be included in a numerical range. Different sub-ranges of the numerical range may be associated with the presence and/or absence of a fault, and/or with different types of faults.

The one or several time series fed by a decision-making logic to the ML model and/or, if present, the one or several additional time series fed by at least one additional decision-making logic to the ML model may be vectors.

The ML model may have an output dense layer.

The decision-making logic output may be a time series.

The time series may toggle between a first value and a second value.

The time series may have only values that are either the first value or the second value.

The first and second values may be fixed.

The first value may be a first indicator value indicating that the decision-making logic considers a fault to be present and the second value may be a second indicator value indicating that the decision-making logic considers the fault to be absent.

The ML model may have a cell having a forget gate and/or an input gate.

The ML model may comprise a LSTM cell or a GRU cell or another recurrent architecture comprising different gates.

Biases of an ANN layer or RNN layer or the LSTM cell or the GRU cell may be zero.

The GRU cell may be a fully gated GRU cell.

The ML model may be operative to perform non-linear low-pass filtering of the decision-making logic output.

The decision-making logic may be a further ML model.

The decision-making logic and the ML model processing the decision-making logic output may be trained jointly or separately.

The inputs to the decision-making logic may comprise voltage and/or current measurements.

The inputs to the decision-making logic may include measurements received from a current transformer in a power transmission line.

The inputs to the decision-making logic may include bus bar voltage measurements.

The inputs to the decision-making logic may be included in messages of an industrial automation control system (IACS).

The inputs to the decision-making logic may be included in messages in accordance with IEC 61850 (e.g., in accordance with or compatible with 61850-7-1:2011 or IEC 61850-8-1:2011).

The inputs to the decision-making logic may comprise voltage and current measurements at an end of a transmission line of a power transmission system or of a distribution line of a power distribution system.

The action may comprise or may be selected from a corrective action, a protective action, causing information to be output via a human machine interface (HMI).

The action may be a circuit breaker (CB) trip.

The method may be a power system asset protection method.

The method may be performed by a protection relay.

The method may be performed by a distance protection relay.

The method may be performed by one or several devices of a protection system for an electric power system.

The method may respectively be performed by devices functionally associated with opposite ends of a power transmission line.

The method may be a method for asset protection of an electric power system asset.

The electric power system may be a power generation, transmission or distribution system.

The asset may be a power transmission line or distribution line.

Performing the action may comprise causing a CB trip responsive to the ML model output.

According to another embodiment, a method of generating a protection logic for a protection device, in particular for a protection relay, is provided, which may comprise training a ML model comprising one or several RNN layer(s) and deploying the trained ML model to a protection device for processing an output of a decision-making logic.

The method may comprise training the ML model using a synthetic data set.

The synthetic dataset may comprise a several time series of ML model input values that may toggle between a first value and a second value.

The first and second values may be fixed.

The first value may be a first indicator value indicating presence of a fault to be present and the second value may be a second indicator value indicating absence of the fault.

The synthetic dataset may comprise a desired ML model output for each of the time series of ML model input values.

Training the ML model may comprise training the ML model jointly with a further ML model, wherein the further ML model provides its output as input to the ML model.

The method may further comprise using, by the protection device, the trained ML model to process the output of the decision-making logic.

The ML model may be used by the protection device as described in association with the method of monitoring, protecting, or controlling an asset.

According to another embodiment, a use of a ML model for processing an output of a decision-making logic of a protection device is provided, in particular for performing nonlinear low pass filtering of the output of the decision-making logic (e.g., by performing an integration) to determine whether a corrective, protective, or mitigating action is to be taken.

The ML model may have an ANN layer.

The ML model may have a RNN layer.

The ML model may have several RNN layers.

The ML model may have an output dense layer.

The decision-making logic output may be a time series.

The time series may toggle between a first value and a second value.

The first and second values may be fixed.

The first value may be a first indicator value indicating that the decision-making logic considers a fault to be present and the second value may be a second indicator value indicating that the decision-making logic considers the fault to be absent.

The ML model may have a cell having a forget gate and/or an input gate.

The ML model may comprise a LSTM cell or a GRU cell or another recurrent architecture comprising different gates.

Biases of the ANN or RNN or the LSTM cell or the GRU cell may be zero.

The GRU cell may be a fully gated GRU cell.

The protection device may be a protection relay.

The action may be a CB trip.

According to another embodiment, a use of a ML model for replacing a threshold comparison and counter downstream of a decision-making logic is provided. Optional features of the ML model and/or the decision-making logic (such as the various possible forms of its decision-making logic output) may correspond to the optional features described above and elsewhere herein.

Various effects and advantages are attained by the devices, systems, and methods according to embodiments. The ML model may be trained using synthetic or observed data, obviating the need for a human expert to set parameters of a counter and a threshold.

The ML model can be trained to act as a nonlinear low-pass filter for the output of the decision-making logic, balancing speed and dependability of the device in which the ML model is used.

The parameters of the trained ML model (e.g., the parameters of a LSTM cell or GRU cell or another recurrent architecture comprising different gates) afford interpretability of the logic implemented by the ML model.

The ML model lends itself to being used with not only one but several decision-making logics. For illustration, a number of ANN or RNN layers may be increased to accommodate the processing of outputs of a first decision-making logic that implements a time-domain protection function and of a second decision-making logic that implements a distance protection function.

BRIEF DESCRIPTION OF THE DRAWINGS

The subject-matter of the present disclosure will be explained in more detail with reference to preferred exemplary embodiments which are illustrated in the attached drawings, in which.

DETAILED DESCRIPTION OF EMBODIMENTS

Exemplary embodiments will be described with reference to the drawings in which identical or similar reference signs designate identical or similar elements. While some embodiments will be described in the context of distance protection of a power distribution or transmission systems, the methods and devices described in detail below may be used in a wide variety of systems.

The features of embodiments may be combined with each other, unless specifically noted otherwise.

According to embodiments, an output of a decision-making logic is fed to a machine learning (ML) model. The ML model may have one or several recurrent neural network (RNN) layer(s). The ML model may be configured to perform nonlinear low pass filtering, in particular integration. This may be attained by training the ML model, without requiring a human expert for setting parameters of a threshold comparison and counter (as is the case for the logic of FIG. 12).

Figure 1:
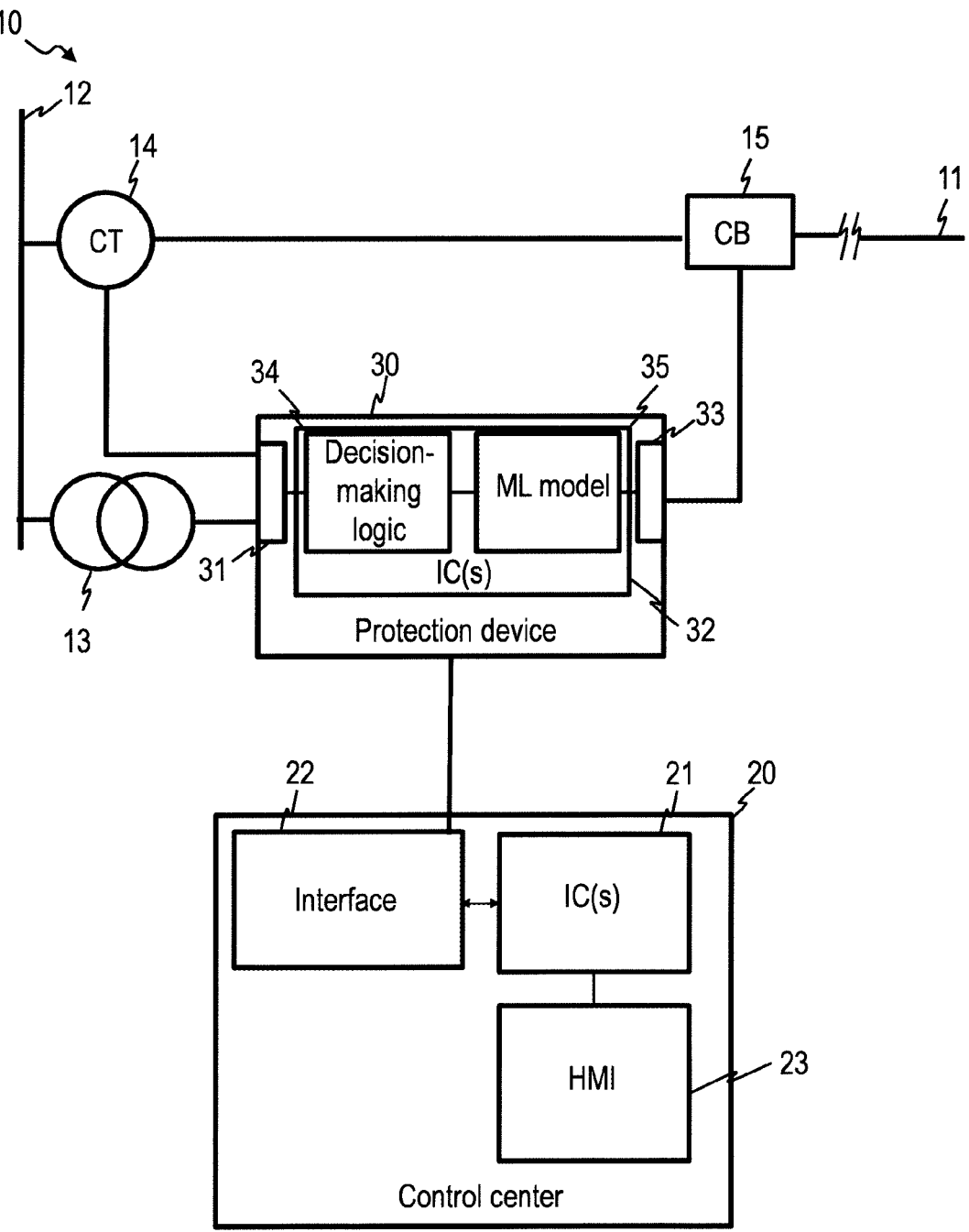
FIG. 1 is a schematic representation of a system comprising an asset protection, monitoring, or control device.

FIG. 1 shows an electric power system comprising an asset protection, monitoring, or control device. The asset protection, monitoring, or control device is a protection device 30. The protection device 30 may be a protection relay, in particular a distance protection relay.

The protection device 30 may be arranged at an end of a power transmission line 11 or a power distribution line. The protection device 30 is operative to cause a circuit breaker (CB) 15 to trip responsive to detection of a fault and, optionally, responsive to detecting that the fault is in a zone for which the protection device 30 is responsible.

The protection device 30 has an input interface 31 to receive measurements. The measurements may include voltage measurements at a local bus 12 provided by a voltage transformer (VT) 13 and current measurements provided by a current transformer (CT) 14. The inputs received at the input interface 31 may be provided to a decision-making logic, it being understood that some pre-processing (such as filtering, Fourier transform, principal components analysis, other statistics techniques) may be performed to the inputs as they pass from the interface 31 to the decision-making logic.

The protection device 30 may be operative to process the current and voltage measurements to determine whether there is a fault which requires a mitigating or protective action, such as trip of the CB 15. The protection device 30 may have one or several integrated circuit(s) (IC(s)) to perform the processing.

The protection device 30 has an output interface 33 to output a control signal to effect an action, such as a protective or mitigating action. The protection device 30 may be communicatively coupled to other devices in the system 10. For illustration, the protection device 30 may be communicatively coupled to a control center 20. The protection device 30 may output information on the detection of the fault to the control center 20 for outputting via a human-machine interface (HMI) 23. The control center 20 may have IC(s) 21 to process messages received from the protection device 30 at an interface 22 and for controlling the HMI 23 responsive thereto.

Figure 2:
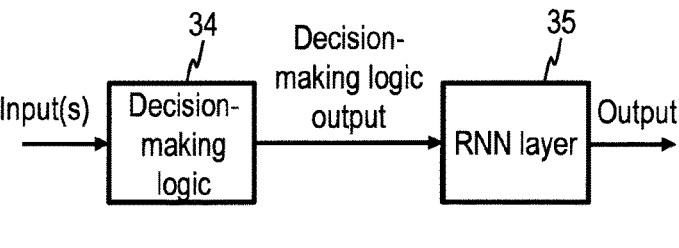
FIG. 2 is a functional block diagram representation of an asset protection, monitoring, or control device.
Figure 3:
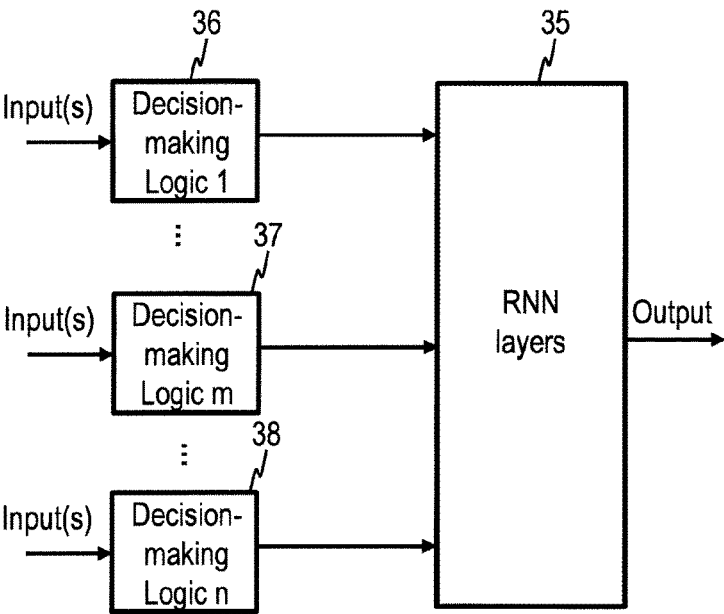
FIG. 3 is a functional block diagram representation of an asset protection, monitoring, or control device.

As shown in FIGS. 1-3, the protection device executed a decision-making logic 34 and a ML model 35 that processes outputs of the decision-making logic 34.

The decision-making logic 34 may receive voltage and/or current measurements or other inputs and may process the inputs to generate a decision-making logic output. The decision-making logic output may be a time series. The time series may have samples that may correspond to discrete, constant time intervals. For illustration, a new decision-making logic time series sample may be generated by sampling the inputs at constant intervals. The time series may be a time series of scalars or may be a time series of vectors.

When the decision-making logic output is a time series of scalars, the time series may be binary. The time series may toggle between a first value and a second value. The first value may be a first indicator value indicating that the decision-making logic 34 considers a fault to be present and the second value may be a second indicator value indicating that the decision-making logic 34 considers the fault to be absent. The time series may be real- or complex valued, without being necessarily limited to just the first and second values.

When the decision-making logic output is a time series of vectors, the time series of vectors may have one or several vector elements that are binary and that may toggle between a first value and a second value. The first value may be a first indicator value indicating that the decision-making logic 34 considers a fault to be present and the second value may be a second indicator value indicating that the decision-making logic 34 considers the fault to be absent. The time series of vectors may comprise real- or complex valued vector elements.

The decision-making logic 34 may be a conventional protection logic. For illustration, the decision-making logic 34 may be a conventional distance protection function or time domain protection function, which outputs a time series of values that indicate whether a certain fault is deemed to be present or absent at the respective time. The fault may be a ground fault in a zone for which the protection device 30 is responsible.

The ML model 35 may have one or several artificial neural network (ANN) layers, such as RNN layers, as will be explained below. The ML model 35 may have a cell having a forget (or reset) gate and/or an input gate, such as a long-short term memory (LSTM) cell or a gated recurrent unit (GRU) cell. The ML model 35 may be operative to perform non-linear low-pass filtering of the decision-making logic output. Other structures, e.g. other recurrent structures having several gates, may be used.

In the case of a single decision-making logic 34 feeding its output to the ML model 35 (as shown in FIG. 2), the RNN layer may be comprised of one single input single output LSTM layer. The weights of the LSTM layer are trained using ML. This is typically done before field use, but training or re-training or other updating of the ML during field use is contemplated. The single input single output LSTM layer affords full interpretability of how the decision-making logic output is processed by the ML model. Weights in RNN (or more generally ANN) layer definition correspond to threshold scaling and accumulation or reset of the time series, as will be explained in more detail for a specific example below.

As shown in FIG. 3, the ML model 35 may be fed with outputs from two or more decision-making logics 36-38. Two or more of the decision-making logics 36-38 may correspond to different protection functions. At least one of the decision-making logics 36-38 may be a distance protection function logic, and another one of the decision-making logics 36-38 may be a time-domain protection function. Use of a ML model having an ANN structure facilitates aggregation of the decisions of several decision-making logics 36-38, as shown in FIG. 3.

Sensitivities and/or response times of a first decision-making logic and second decision-making logic of the two or more decision-making logics 36-38 may be different from each other. The different sensitivities and response times is automatically accounted for in ML model training.

Even in this more complex case, the trained ML model parameters (such as weights of an ANN or parameter matrices or vectors of a GRU cell or LSTM cell) afford interpretability. For illustration, the ML model weights indicate how strongly the various decision-making logic outputs from the different decision-making logics 36-38.

The ML model 35 can have non-linear low pass characteristics, such as integrator characteristics. The ML model 35 can implement low pass filter or more specifically, an integrator.

The ML model 35 can be operative to update a state variable of the ML model (such as the value of a neuron or a state value $h_t$ of a GRU cell or LSTM cell or other recurrent cell having several gates) responsive to a new time series sample received in the decision-making logic output so that it performs an accumulation or integration of the time series output by the decision-making logic received over time.

The ML model 35 can be operative to update a state variable of the ML model (such as a value of a neuron or a state value $h_t$ of a GRU cell or LSTM cell or other recurrent cell having several gates) responsive to a new sample of a time series in the decision-making logic output so that the state variable increases (e.g., by an increment that may be fixed or variable) when the time series sample is a first indicator value indicating that the decision-making logic considers a fault to be present.

The ML model 35 can be operative to update a state variable of the ML model (such as a value of a neuron or a state value $h_t$ of a GRU cell or LSTM cell or other recurrent cell having several gates) responsive to a new sample of a time series in the decision-making logic output so that the state variable decreases (e.g., by re-setting it or by decreasing it by a decrement that may be fixed or variable) when the time series sample is a second indicator value indicating that the decision-making logic considers the fault to be absent.

Figure 12:
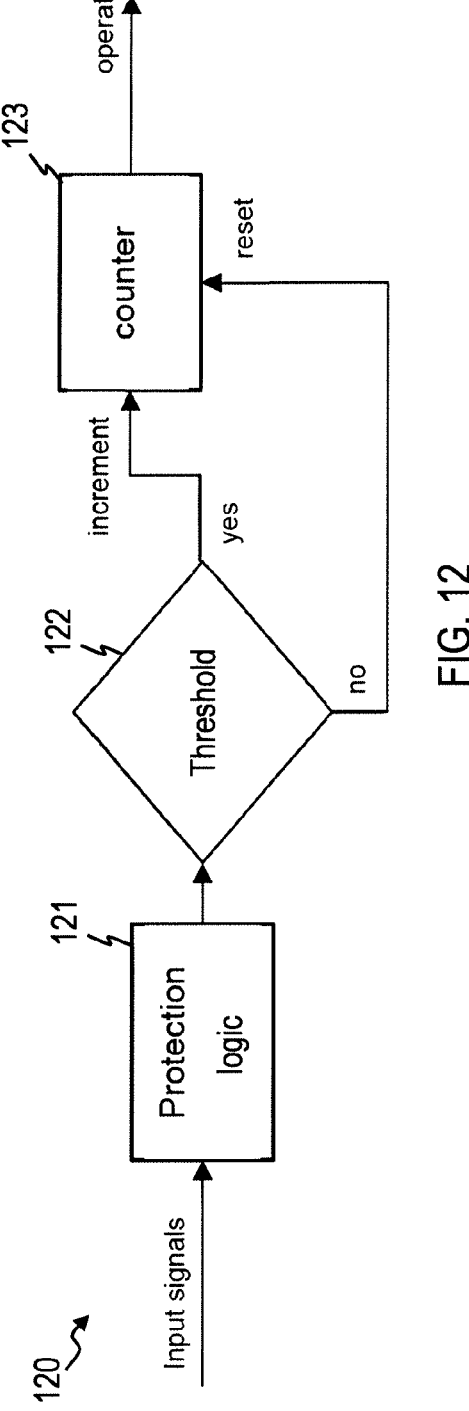
FIG. 12 is a schematic block diagram that uses a counter.

The ML model 35 affords flexibility to implement a behavior that mimics various reset strategies of conventional counter-based logics (as shown in FIG. 12). The ML model 35 can accommodate different strategies used for resetting the accumulated value of consecutive decision-making logic time series samples adhering to a given criterion. Depending on the data used for ML model training (which can be synthetically generated or data collected in field-use), the ML model can be implemented such that the accumulation of the time-sequentially received decision-making logic time series samples is reset when a new time series sample output by the decision-making logic is a second indicator value indicating that the decision-making logic considers a fault to be absent. The ML model can be implemented such that it uses softer reset strategies.

The RNN is capable of learning the task of processing the decision-making logic output. For a single decision-making logic 34 (e.g., a single protection logic), the RNN may be a single neuron unit.

Embodiments provides various effects.

Based on a dataset, which reflects probabilities of events (e.g., probability of a ground fault or short circuit fault in the zone for which the protection device is responsible or for other zones), the ML model can be trained to achieve the optimal solution, or in case no perfect solution exists, different emphasis can be given to speed, security and dependability.

By using a ML model downstream of the decision-making logic, a differentiable logic is provided. This means that it can be incorporated into a larger ML model. For illustration, the one or several ANN (e.g., RNN) layers can be included in a larger, more complex protection system logic based on ANNs. In this case, rather than tuning the ANN (or other ML model) implementing the decision-making logic and the ML model that processes the output of the decision-making logic independently, an embodiment allows the decision-making logic and the ML model that processes the output of the decision-making logic to be trained together. This reduces training time and can improve performance of the overall protection system, because the overall logic is optimized, rather than optimizing each component part separately.

The solution is interpretable. For example, in the case of a single input and single output LSTM recurrent layer consisting of 12 weights, it is possible to interpret the weights as increment, reset rules and operate decisions, as will be explained below.

The ML model is small in terms of memory requirements and does not require very high computational power to be trained.

The ML model can be readily deployed to protection, monitoring, or control devices in the field. The ML model can be deployed to IEDs (e.g., IEDs in accordance with IEC 61850, such as IEDs compatible with IEC 61850-3:2013 and/or operative to communication in a manner that is compatible with IEC 61850-6:2009).

Figure 4:
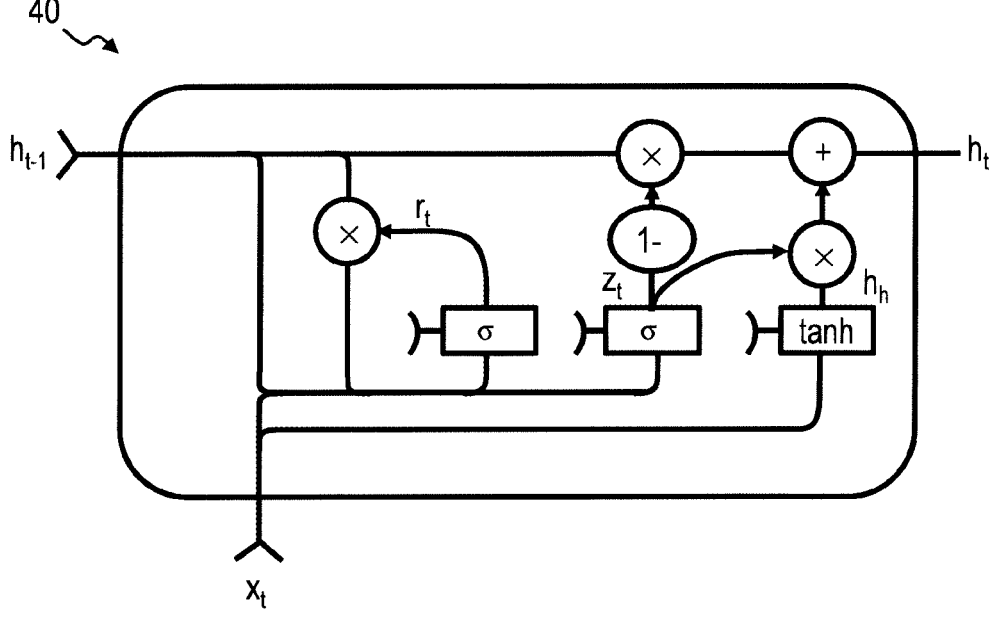
FIG. 4 is a diagram representation of a gated recurrent unit (GRU) cell that may be used in a machine learning model of an asset protection, monitoring, or control device.

FIG. 4 shows a fully gated GRU cell 40. The ML model can comprise the GRU cell 40. If the input to the ML model is the output of a single decision-making logic, the ML model can be the GRU cell followed by an output dense layer, as will be explained in more detail below. The GRU cell and a LTSM cell respectively have a reset gate (also referred to as forget gate) that facilitates training them to provide the desired characteristics for processing a time series output by the decision-making logic, i.e., by increasing a numerical value (such as a state variable of the ML model) for any output value of the decision-making logic that indicates that the decision-making logic considers a fault to be present and by decreasing the numerical value for any output value of the decision-making logic that indicates that the decision-making logic considers the fault to be absent.

Figure 5:
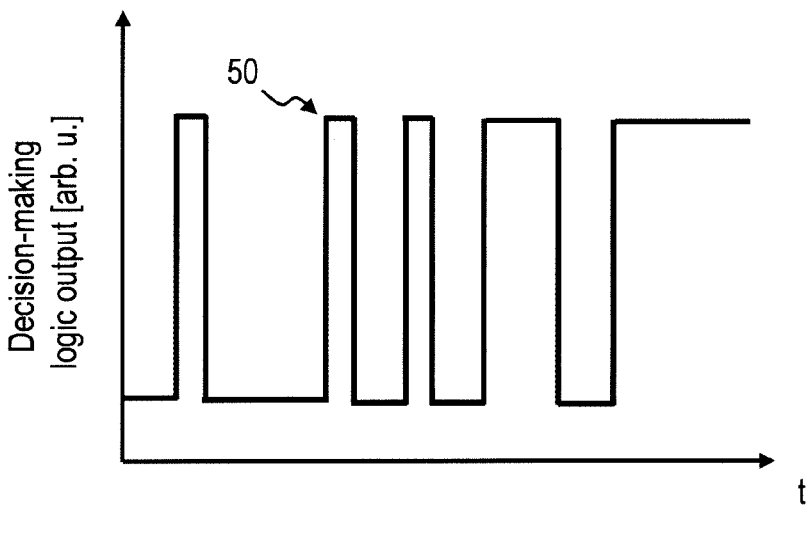
FIG. 5 is a schematic representation of an input of a machine learning model of an asset protection, monitoring, or control device.

FIG. 5 shows an exemplary input 50 to the ML model 35. The input to the ML model (also referred to as ML model input herein) is the decision-making logic output. The decision-making logic output may be a time series. The time series samples may correspond to discrete, constant time intervals (also referred to as sample times). For illustration, a new time series sample may be generated by the decision-making logic by sampling the inputs at constant intervals. The time series sample may be or may comprise a scalar or may be a vector.

The time series output by the decision-making logic may be or may include a binary output signal, without being limited thereto. The time series output by the decision-making logic may toggle between a first value and a second value. The first value may be a first indicator value indicating that the decision-making logic 34 considers a fault to be present and the second value may be a second indicator value indicating that the decision-making logic 34 considers the fault to be absent. The first and second indicator values may be fixed numerical values.

While a decision-making logic output that toggles between two discrete states is shown in FIG. 5, other implementations of the decision-making logic 34 and the ML model 35 may be used. For illustration, the decision-making logic may output a time series of indicator values that may toggle between three or more than three discrete values. One of the discrete values may indicate the absence of a fault, and the other discrete values may indicate which one of several possible faults is deemed to be present by the decision-making logic.

The decision-making logic output may output a real- or complex-valued scalar. The real-valued scalar may be included in a numerical range. Different sub-ranges of the numerical range may be associated with the presence and/or absence of a fault, and/or with different types of faults. Real and imaginary parts or modulus and phase of a complex-valued scalar may be included in numerical ranges. Different sub-ranges of the numerical ranges may be associated with the presence and/or absence of a fault, and/or with different types of faults.

The decision-making logic output may be a vector having plural vector elements. The vector elements may be taken from discrete values, continuous values from within a range, or combinations thereof (some vector elements being selected from discrete values and others being from within continuous ranges).

Figure 6:
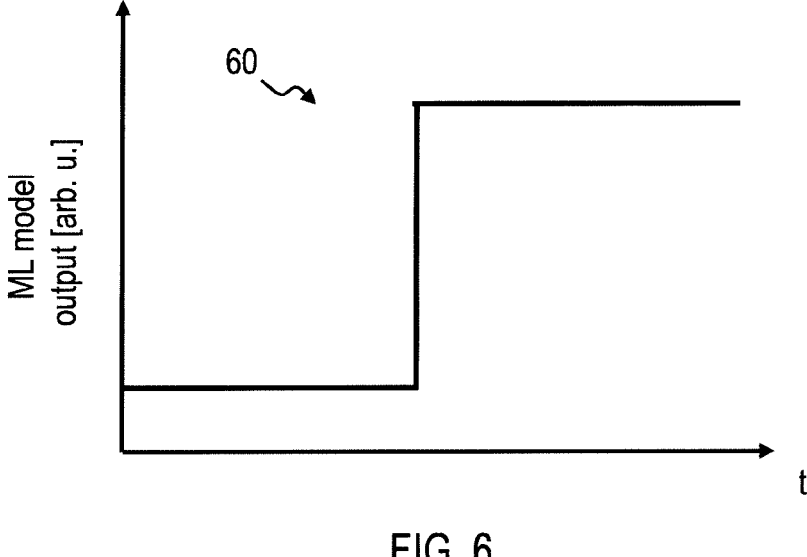
FIG. 6 is a schematic representation of an output of a machine learning model of an asset protection, monitoring, or control device.

FIG. 6 shows an exemplary output 60 of the ML model. The ML model output 60 may be a binary output. A first ML model output value may indicate that a certain action is not to be triggered. A second ML model output value may indicate that the action is to be triggered. The action may be any one or any combination of: a corrective action, a mitigating action, a protective action, causing information to be output via a HMI. A CB trip is exemplary for such an action.

While a ML model output 60 toggling between two discrete values is shown in FIG. 6, the ML model output 60 may toggle between three or more than three discrete values. For illustration, a first one of the ML model output values may indicate that no action is required, a second one of the ML model output values may cause a first type of control action to be performed, and a third one of the ML model output values may cause a third type of control action to be performed.

Figure 7:
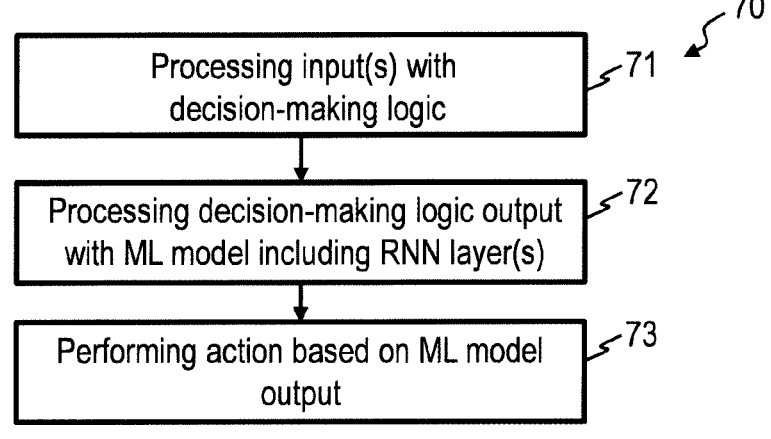
FIG. 7 is a flow chart of a method.

FIG. 7 is a flow chart of a method 70. The method 70 may be performed automatically by a device according to an embodiment.

At step 71, a decision-making logic 34 processes inputs. The inputs may include current and/or voltage measurements. The inputs may include current and/or voltage measurements at a local end of a power transmission line (i.e., the end at which the device is provided). The inputs be received from current and voltage transformers. The inputs may be included in messages of an IACS.

At step 72, the decision-making logic output is processed with the ML model 35. The ML model may include one or several ANN (e.g., RNN) layer(s). The ML model may be operative to increase a numerical value (e.g., a state variable of the ML model) responsive to a time series sample provided by the decision-making logic that shows that the decision-making logic considers a fault to be present. The ML model may be operative to decrease the numerical value (e.g., a state variable of the ML model) responsive to a time series sample provided by the decision-making logic output that shows that the decision-making logic considers the fault to be absent. Outputs from several decision-making logics may be processed similarly.

At step 73, an action is performed responsive to the ML model output. The action may be any one or any combination of: a corrective action, a mitigating action, a protective action, causing information to be output via a HMI. A CB trip is exemplary for such an action.

Figure 8:
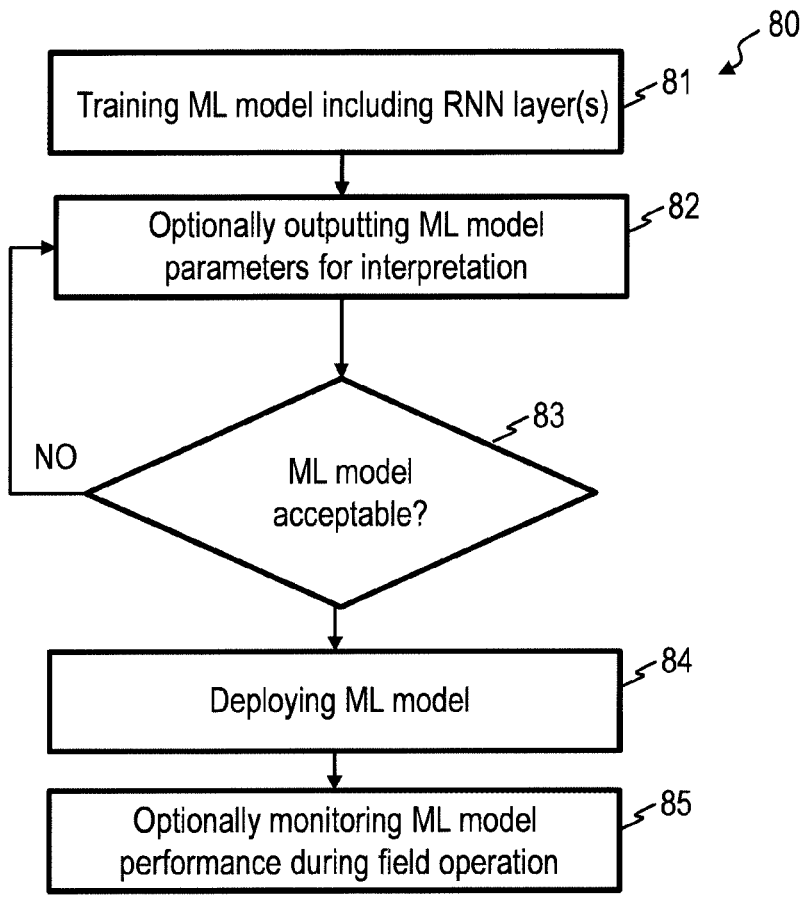
FIG. 8 is a flow chart of a method.

FIG. 8 is a flow chart of a method 80. The method 80 may be performed automatically by a computing device.

Figure 9:
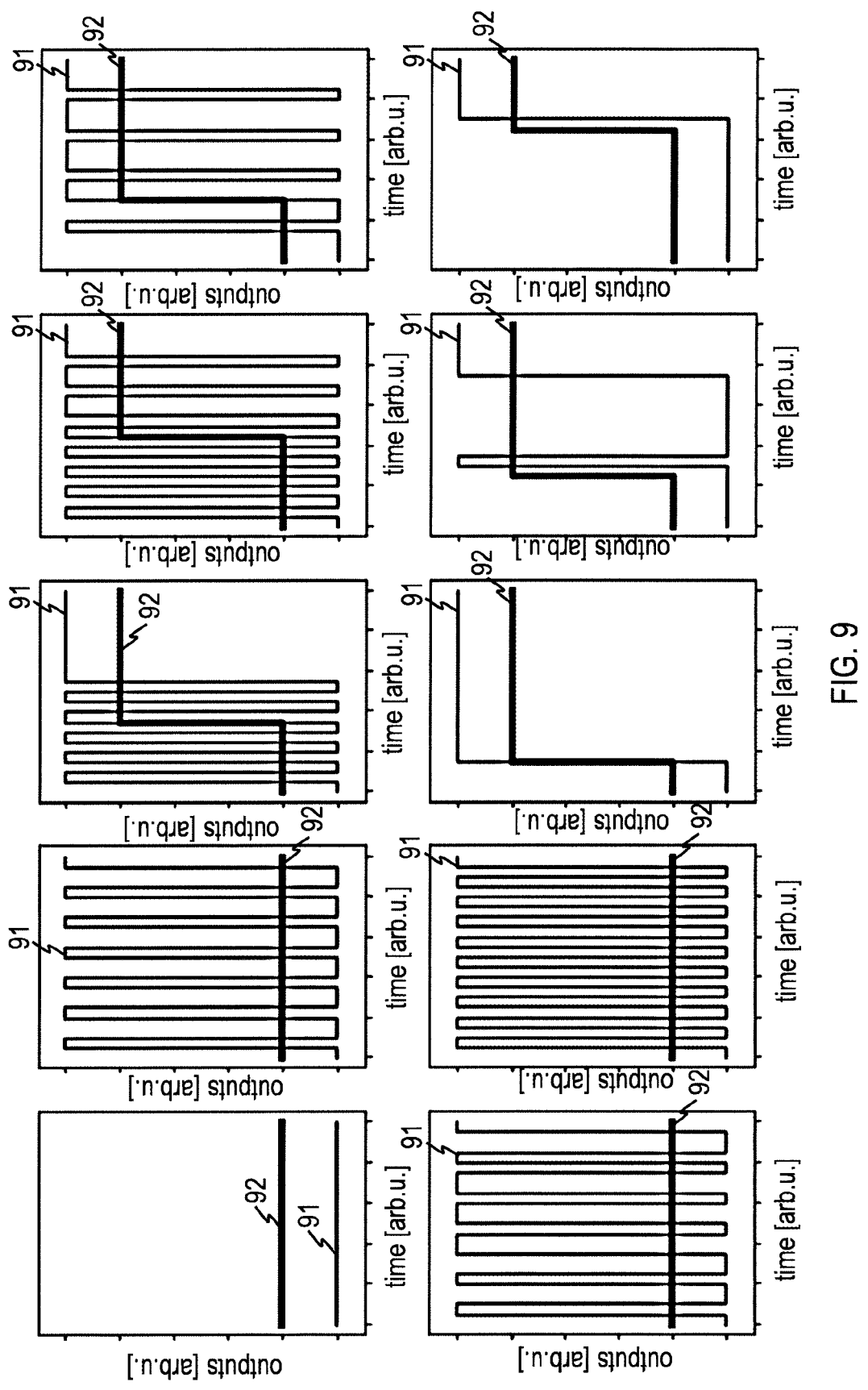
FIG. 9 shows training signals of training data for training a machine learning model of an asset protection, monitoring, or control device.

At step 81, training of the ML model is performed. This may be done prior to field use of the ML model. The training may be supervised training. The training may be based on data collected during field use and/or synthetically generated data that includes a time series of ML model inputs and an associated desired ML model output. The training may be implemented using conventional techniques such as back-propagation-through-time. A dataset including ten or more (as shown in FIG. 9), twenty or more, thirty or more time series of ML model inputs and an associated desired ML model output may be used.

At step 82, some of the trained ML model parameters may be output, e.g., via a HMI. The trained ML model outputs may be provided to a human operator for interpretation of the trained ML model.

At step 83, it may optionally be determined whether the ML model is suitable for field use. The determination may be made based on operator input and/or automatically. For illustration, it may be determined whether the ML model parameters obtained in the training ensure that there are no missed faults.

At step 84, the ML model may be deployed. The ML model may be deployed during configuration or commissioning of an electric power system or IACS. The ML model may be deployed during field use of a protection device, e.g., in an update procedure.

At step 85, operation of the ML model during field use may be monitored. Re-training of the ML model may be selectively initiated depending on ML model performance during field use.

ML Model Implementation

An implementation of the ML model will be described in more detail below for further illustration. A wide variety of other implementations of the ML model that processes the output of the decision-making logic may be used.

The ML model may have a single GRU layer and a single neuron dense output layer.

The GRU cell may have all of its biases set to zero. In this case, the GRU cell (similar to the cell illustrated in FIG. 4) may be defined by the following set of equations:

$$z_t = \sigma(W_z \cdot x_t + U_z \cdot h_{t-1}) \tag{1}$$

$$r_t = \sigma(W_r \cdot x_t + U_r \cdot h_{t-1}) \tag{2}$$

$$h_h = \tan h(W_h \cdot x_t + r_t \odot (U_h \cdot h_{t-1})) \tag{3}$$

$$h_t = z_t \odot h_{t-1} + (1 - z_t) \odot h_h \tag{4}$$

In Equations (1)-(4), the following notation is used:

$x_{t-1}$: ML model input at time t−1;

$h_{t-1}$: previous GRU layer output (at time t−1);

$h_t$: current GRU layer output (at time t);

$\sigma$: recurrent activation function (e.g., a sigmoid; e.g., $\sigma(v) = 0$ for $v < 0$, $\sigma(0) = 0.5$, $\sigma(V) = 1$ for $v > 0$);

$h_h$: candidate for next GRU cell state;

$W_z$, $W_r$, $W_h$: Kernel weights;

$U_z$, $U_r$, $U_h$: recurrent weights;

$\odot$: Hadamard product.

Equations (1)-(3) may optionally include biases. Experiments conducted show that the biases may be set to zero. Inclusion of the biases allows further fine-tuning of the ML model, but the biases can be set to zero while still affording enhanced speed and dependability.

Various modifications may be used. For illustration, an activation function other than a hyperbolic tangent may be used in Equation (3). For further illustration, the coefficient of $h_{t-1}$ and $h_h$ in Equation (4) may be exchanged.

The output dense layer serves as a final output scaling and can be defined as:

$$y_t = \sigma_a(W_d \cdot h_t + b_d) \tag{5}$$

In Equation (5), the following notation is used:

$\sigma_a$: dense activation function (e.g., a sigmoid)

$y_t$: output of ML model at time t;

$W_d$: dense Kernel weights;

$b_d$: dense bias weights.

By considering various exemplary cases (namely cases in which $x_t$ and/or $h_{t-1}$ are set to zero), the interpretability of the parameters of the trained model can be determined.

For $x_t = 0$ and $h_{t-1} = 0$, one obtains:

$$z_t = \sigma(0) = 0.5 \tag{6}$$

$$r_t = \sigma(0) = 0.5 \tag{7}$$

$$h_h = \tan h(0 + r_t \odot 0) = 0 \tag{8}$$

$$h_t = z_t \odot h_{t-1} + (1 - z_t) \odot h_h = 0 \tag{9}$$

$$y_t = \sigma_a(b_d) \tag{10}$$

For $x_t > 0$ and $h_{t-1} = 0$, one obtains:

$$z_t = \sigma(W_z \cdot x_t) \tag{11}$$

$$r_t = \sigma(W_r \cdot x_t) \tag{12}$$

$$h_h = \tan h(W_h \cdot x_t) \tag{13}$$

$$h_t = (1 - z_t) \odot h_h \tag{14}$$

For $x_t = 0$ and $h_{t-1} > 0$, one obtains:

$$z_t = \sigma((U_z \cdot h_{t-1}) \tag{15}$$

$$r_t = \sigma(U_r \cdot h_{t-1}) \tag{16}$$

$$h_h = \tan h(r_t \odot (U_h \cdot h_{t-1})) \tag{17}$$

$$h_t = z_t \odot h_{t-1} + (1 - z_t) \odot h_h \tag{18}$$

The various parameters can be interpreted as follows:

The dense layer bias $b_d$ determines an initial output of the ML model (as can be concluded from, e.g., Equation (10)).

Kernel weight $W_h$ quantifies an initial accumulation of the input state (as can be concluded from, e.g., Equations (11)-(14)).

Recurrent weight $U_z$ quantifies the preservation of the previous state, which also increases an accumulation of the input signal (as can be concluded from, e.g., Equations (15)-(18)).

Recurrent weight $U_h$ softens a reset as it determines how much of the previous output is kept (as can be concluded from, e.g., Equations (15)-(18)).

Kernel weight $W_z$ influences the ratio of the previous state and the next candidate state if $x_t > 0$. The larger $W_z$, the slower the speed of accumulation.

Kernel weight $W_r$ increases a speed of reset.

Recurrent weight $U_r$ softens a reset.

Thus, the parameters of the ML model can be interpreted in a quantitative manner. The parameters quantify the initial output of the ML model, the speed at which the ML model input x is accumulated, the speed at which an internal state (e.g., h) of the GRU or LSTM cell is reset, and whether the reset is softer or harder.

Operation of the ML model is quantitatively assessed in comparison with a conventional logic as shown in FIG. 12.

The ML model was trained using a dataset of synthetically generated ML model inputs 91 and corresponding desired ML model outputs 92, as shown in FIG. 9. Supervised learning was performed. While only ten ML model inputs 91 and ten associated ML model outputs are shown in FIG. 9, additional or alternative training data may be used. The ML model uses a single LTSM or GRU cell with a dense output layer. The ML model acts as a non-linear low pass filter to the binary decision made by the decision-making logic, refining its decision.

For comparison, the parameters of a counter threshold logic as shown in FIG. 12 were adjusted to give the right answer in all of the ten synthetically generated scenarios of FIG. 9. Performance of the trained ML model was compared to performance of a counter threshold logic similar to that of FIG. 12 (with a hard reset of the counter value being performed whenever the decision-making logic output indicates that the decision-making logic considers a fault to be absent).

The trained ML model had at least the same performance as the counter threshold logic of FIG. 12. The trained ML model outperformed the counter threshold logic of FIG. 12 in various for various of the scenarios with regard to speed. This is exemplarily shown in FIG. 10.

Figure 10:
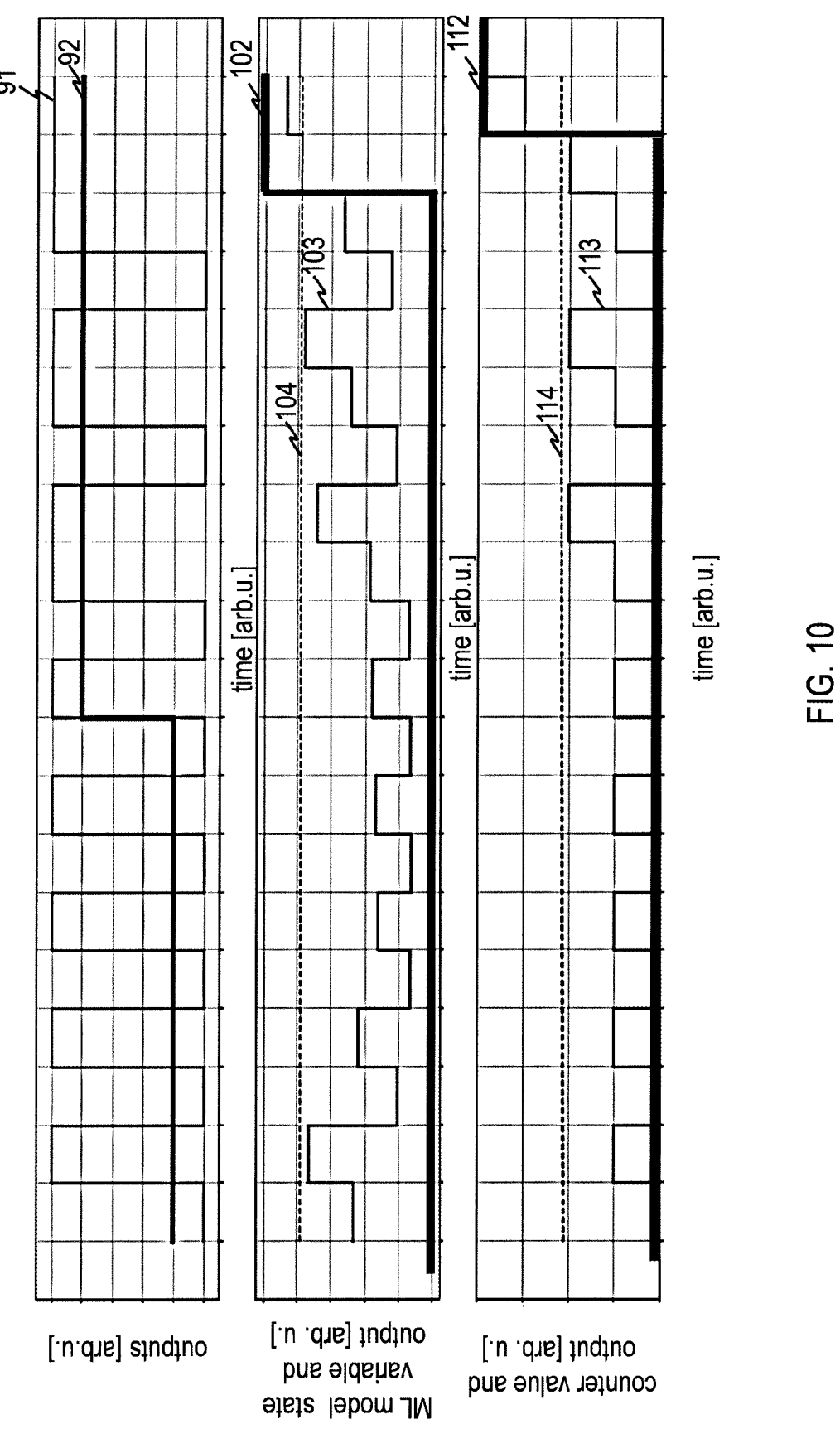
FIG. 10 shows a comparison of a protection device according to an embodiment and a conventional protection device.

In FIG. 10, the top panel of FIG. 10 shows part of the synthetically generated ML model input 91 and ML output 92 from the fourth graph in the top line of FIG. 9. The center panel shows an internal state variable 103 of the ML model (in this case $h_t$ of the GRU or LSTM cell), the output 102 of the ML model (in this case $y_t$ of the output dense layer), and a broken line 104 indicating at which value of the state variable 103 of the ML model the output 102 toggles to a state in which a fault is identified. The bottom panel shows the counter value 113 of the counter 123 of a counter threshold logic as illustrated in FIG. 12, a threshold value 114 at which the output of the logic changes states, and the resulting counter threshold logic output 112.

As can be seen in FIG. 10, the ML model output 102 indicates the fault earlier than the counter threshold logic output 112.

The ML model also mitigates the risk of false alarms. This is further illustrated in FIG. 11.

Figure 11:
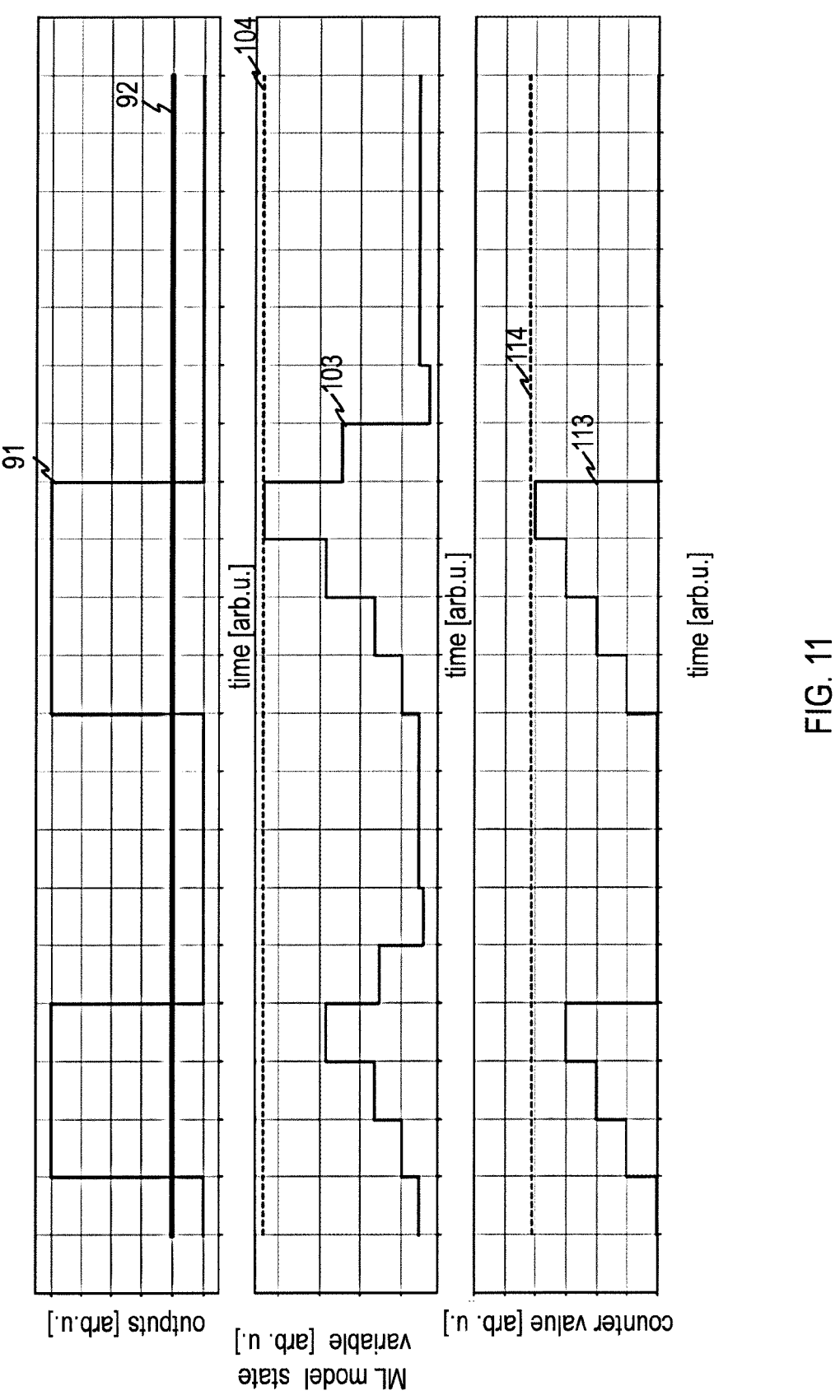
FIG. 11 shows a comparison of a protection device according to an embodiment and a conventional protection device.

In FIG. 11, the top panel of FIG. 11 shows part of the synthetically generated ML model input 91 and ML output 92 from the second graph in the lower line of FIG. 9. In this case, it is expected that no fault is detected by the output of the ML model and by the output of the counter threshold logic. The center panel shows an internal state variable 103 of the ML model (in this case $h_t$ of the GRU or LSTM cell), the output 102 of the ML model (in this case $y_t$ of the output dense layer), and a broken line 104 indicating at which value of the state variable 103 of the ML model the output 102 would to a state in which a fault is identified. The bottom panel shows the counter value 113 of the counter 123 of a counter threshold logic as illustrated in FIG. 12, a threshold value 114 at which the output of the logic changes states, and the resulting counter threshold logic output 112.

As seen in the lower panel of FIG. 11, in order to avoid false alarms, the counter threshold value 114 needs to be set to four. However, this would cause alarms to be missed in other scenarios of FIG. 9 (e.g., in the scenarios of the fourth and fifth graphs in the top line of FIG. 9, where it is expected that a fault is identified).

The device according to an embodiment properly raises all alarms with no false ones, providing enhanced speed and dependability for the synthetic dataset.

While embodiments have been described with reference to the drawings, various modifications and alterations may be implemented in other embodiments. For illustration, while some embodiments have been described in association with a CB trip, the methods, devices, and systems of embodiments may not only be used to determine whether an action is to be performed that protects an asset from (more severe) damage, but may also be used to determine whether the asset operation may safely return to its normal operation (e.g., by performing an auto reclose).

For further illustration, while an implementation has been described in which a GRU has its biases set to zero, the ML model may include one or several GRUs or other ANN or RNN structures having biases that do not need to be zero and that may be learned when training the ML model 35. For illustration, the ML model 35 may include a GRU cell defined by the following equations:

$$z_t = \sigma(W_z \cdot x_t + U_z \cdot h_{t-1} + b_z) \tag{19}$$

$$r_t = \sigma(W_r \cdot x_t + U_r \cdot h_{t-1} + b_r) \tag{20}$$

$$h_h = \tan h(W_h \cdot x_t + r_t \odot (U_h \cdot h_{t-1}) + b_h) \tag{21}$$

$$h_t = z_t \odot h_{t-1} + (1 - z_t) \odot h_h \tag{22},$$

where $b_z$, $b_r$, and $b_h$ are biases. One, two or three of the biases may be parameters that may be learned while training the ML model 35.

Various effects are attained by devices, systems, and methods according to embodiments. Parameters used in the logic of the devices, systems, and methods may be determined by ML, obviating the need for a human expert to properly set all parameters of a conventional counter and threshold logic. The devices, systems, and methods mitigate or eliminate the difficulties of setting the parameters while balancing speed and dependability. The devices, systems, and methods have little memory space requirements. The ML model is interpretable and can be readily incorporated into a larger ML-model based protection, control, or monitoring logic.

While embodiments have been described in detail in the drawings and foregoing description, the description is to be considered illustrative or exemplary and not restrictive. Variations to the disclosed embodiments can be understood and effected by those skilled in the art and practicing the embodiments, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used; specifically, in addition to the actual claim dependency, any further meaningful claim combination shall be considered disclosed.

The invention claimed is:

1. An asset protection, monitoring, or control device, the device comprising:

an interface to receive inputs related to an asset; and at least one integrated circuit operative to execute a decision-making logic to process the inputs and generate a decision-making logic output that comprises one or more time series, wherein the decision-making logic processes the inputs to determine whether or not a fault is present, and wherein the one or more time series in the decision-making logic output indicate a presence or absence of a fault, as determined by the decision-making logic, at each time interval in the one or more time series, process the decision-making logic output using a machine learning (ML) model to generate a ML model output that indicates whether or not an action is to be taken, and cause the action to be performed or not performed responsive to the ML model output.

2. The device of claim 1, wherein the ML model is operative to receive the decision-making logic output as a ML model input.

3. The device of claim 1, wherein the device is an asset protection device, the action is a protective action, and the asset protection device further comprises an output interface to output a control signal to effect the protective action.

4. The device of claim 1, wherein the one or more time series toggle between two, three, or more distinct discrete values.

5. The device of claim 1, wherein the ML model has a recurrent neural network (RNN) layer.

6. The device of claim 1, wherein the ML model has a plurality of RNN layers.

7. The device of claim 6, wherein the ML model is operative to process at least one additional decision-making logic output provided by at least one additional decision-making logic.

8. The device of claim 1, wherein the ML model comprises a long short-term memory (LSTM) cell, a gated recurrent unit (GRU) cell, or at least one other gated cell.

9. The device of claim 1, wherein the ML model has an output dense layer.

10. The device of claim 1, wherein the ML model is operative to perform non-linear low-pass filtering of the decision-making logic output.

11. The device of claim 1, wherein the inputs comprise voltage and current measurements at an end of a transmission line of a power transmission system or of a distribution line of a power distribution system.

12. The device of claim 1, wherein the action comprises one or more of:

a corrective action;

a mitigating action;

a protective action, including a circuit breaker trip; or causing information to be output via a human machine interface (HMI).

13. The device of claim 1, wherein the asset monitoring or control device is a power system asset, including a distance protection relay.

14. An electric power system, comprising:

an asset; and a device comprising an interface to receive inputs related to the asset, and at least one integrated circuit operative to execute a decision-making logic to process the inputs and generate a decision-making logic output that comprises one or more time series, wherein the decision-making logic processes the inputs to determine whether or not a fault is present, and wherein the one or more time series in the decision-making logic output indicate a presence or absence of a fault, as determined by the decision-making logic, at each time interval in the one or more time series, process the decision-making logic output using a machine learning (ML) model to generate a ML model output that indicates whether or not an action is to be taken, and cause the action to be performed or not performed responsive to the ML model output.

15. The electric power system of claim 14, wherein the asset is a power transmission or distribution line, and the device is a protection relay operative to cause a circuit breaker trip responsive to the ML model output.

16. A method of protecting, monitoring, or controlling an asset, the method comprising:

executing a decision-making logic to process inputs and generate a decision-making logic output that comprises one or more time series, wherein the decision-making logic processes the inputs to determine whether or not a fault is present, and wherein the one or more time series in the decision-making logic output indicate a presence or absence of a fault, as determined by the decision-making logic, at each time interval in the one or more time series;

processing the decision-making logic output using a machine learning (ML) model to generate a ML model output that indicates whether or not an action is to be taken; and causing the action to be performed responsive to the ML model output.

17. The method of claim 16, wherein the ML model is operative to receive the decision-making logic output as an ML model input.

18. The method of claim 16, wherein the method is a method of protecting an asset, the action is a protective action, and the method further comprises outputting, via an output interface of an asset protection device, a control signal to effect the protective action.

19. The method of claim 16, wherein the one or more time series toggle between two, three, or more distinct discrete values.

20. The method of claim 16, wherein the ML model comprises one or more recurrent neural network (RNN) layers, and the ML model performs non-linear low-pass filtering of the decision-making logic output.

\* \* \* \* \*